United States Patent [19]

Pattison et al.

[11] Patent Number: 5,218,277
[45] Date of Patent: Jun. 8, 1993

[54] CONTROLLER FOR A LINEAR INDUCTION MOTOR

[75] Inventors: Larry Pattison, Amherstview; Greg Ducharme, Kingston, both of Canada

[73] Assignee: UTDC Inc., Kingston, Canada

[21] Appl. No.: 761,687

[22] Filed: Sep. 18, 1991

[51] Int. Cl.$^5$ .......................................... H02K 41/00
[52] U.S. Cl. .................................... 318/135; 318/687
[58] Field of Search ............................... 318/135, 687

[56] References Cited

U.S. PATENT DOCUMENTS

| | | | |
|---|---|---|---|
| 4,227,130 | 10/1980 | Safiuddin et al. | 318/338 |
| 4,315,203 | 2/1982 | Ibamoto et al. | 318/807 |
| 4,458,193 | 7/1984 | Jonsson | 318/803 |
| 4,517,506 | 5/1985 | Heinrich et al. | 318/807 |
| 4,646,223 | 2/1987 | Sekiguchi | 364/130 |
| 4,659,976 | 4/1987 | Johanson | 318/332 |
| 4,661,751 | 4/1987 | Werner | 318/332 |
| 4,664,238 | 2/1987 | Hirosaki | 318/332 |
| 4,672,288 | 6/1987 | Abbondanti | 318/803 |
| 4,772,828 | 9/1988 | Heymans et al. | 318/128 |
| 4,965,864 | 10/1990 | Roth et al. | 318/135 |

FOREIGN PATENT DOCUMENTS 2412486 9/1975 Fed. Rep. of Germany ...... 318/135

Primary Examiner—Steven L. Stephan
Assistant Examiner—Judson H. Jones
Attorney, Agent, or Firm—Baker & Daniels

[57] ABSTRACT

A controller for a linear induction motor primary includes sensors to measure motor operating parameters which allow the thrust developed by the linear induction motor to be determined. In one embodiment, a microprocessor receives the output of the sensors and determines the thrust developed by the linear induction motor. The microprocessor also performs operations to determine an updated supply voltage frequency which will cause the linear induction motor to develop thrust having a magnitude closer to the maximum thrust point of the linear induction motor at the given motor speed if the determined thrust is less than the maximum thrust. The microprocessor monitors the output of the sensors continuously so that the supply voltage frequency is updated continuously. This permits the linear induction motor to develop thrust near to or at its maximum thrust point regardless of changes in the ambient temperature or the linear induction motor secondary characteristics at any given speed.

15 Claims, 7 Drawing Sheets

CONTROLLER FOR A LINEAR INDUCTION MOTOR

FIELD OF THE INVENTION

The present invention relates to linear motors and in particular to a controller for a linear induction motor.

BACKGROUND OF THE INVENTION

Linear induction motors are well known in the art. In some applications the wound portion, or primary, of the linear induction motor is connected to a fixed voltage, fixed frequency power supply. Power is supplied to the motor so that the motor produces a propelling force, accelerates and reaches a steady state speed. The steady state speed is determined by motor characteristics, mechanical characteristics of the load and power supply parameters. Motors designed to operate in such applications are not designed for minimum weight, minimum size and minimum power consumption. Rather, the governing considerations are usually matching motor characteristics to load and minimizing cost. Control of motors used in such applications is usually limited to turning them on and off. An optimized control strategy would not normally be used in such an application.

However, in some environments employing linear induction motors, such as the mass transit vehicle environment, it is desirable to ensure that the linear induction motor the primary of which is carried by the vehicle, develops maximum thrust throughout the course of its operation. By operating the linear induction motor in this manner, it is possible to minimize the required size and weight of the primary while ensuring that the motor develops sufficient thrust for all possible load conditions.

Conventional controllers used to operate linear induction motors in this desired manner make use of memory look-up tables which store predetermined operating parameters for the linear induction motor. The stored operating parameters consist of various motor speeds and the corresponding supply voltage frequencies at which maximum thrust should be developed by the linear induction motor at those speeds. The frequency parameters stored in the memory look-up table are determined through experiment and are dependent upon many factors including the physical construction of both the linear induction motor primary and the linear induction motor secondary, the ambient temperature, the temperature of the linear induction motor primary, as well as the power supply voltage. The parameters are therefore determined with the motor operating under a set of nominal conditions.

During operation of the linear induction motor, the prior art controller consults the look-up table to find the power supply frequency which corresponds to the current operating speed of the linear induction motor. The controller then adjusts the power supply frequency to correspond with that found in the look-up table so that the thrust developed by the linear induction motor primary changes. Based on the speed and frequency pairs stored in the look-up table, the thrust developed by the linear induction motor, in view of the power supply frequency change, should be the maximum thrust point of the linear induction motor.

Although this prior art method of controlling a linear induction motor achieves some success, problems exist in that the thrust developed by the linear induction motor is influenced by a number of factors in addition to the motor operating speed. These additional factors may differ from the nominal conditions under which the motor was operated during formation of the look-up table. For example, the ambient temperature, the temperature of the linear induction motor primary or the resistance of the linear induction motor reaction rail may change causing a shift in the thrust versus frequency characteristic curve of the linear induction motor any given speed. This resultant shift in the characteristic curve causes a shift in the supply voltage frequency at which the linear induction motor develops maximum thrust.

If these changes from the nominal conditions occur and a shift in the thrust versus frequency characteristic curve results, the prior art controllers will select a power supply frequency in accordance with the values in the look-up table that results in the linear induction motor developing thrust having a lesser magnitude than its maximum thrust capability at that motor speed. Depending on the type and the magnitude of the changes in the motor operating parameters, the difference between the thrust developed by the linear induction motor and its maximum thrust capability may vary significantly. In view of this potential difference, linear induction motor primaries have typically been overdimensioned to ensure that the linear induction motor develops sufficient thrust for all possible load requirements despite the changes in the operating parameters of the linear induction motor.

It is therefore an object of the present invention to obviate or mitigate the above-mentioned disadvantages by providing a novel controller for a linear induction motor.

SUMMARY OF THE INVENTION

According to one aspect of the present invention there is provided a controller for a linear induction motor having a primary connected to a variable frequency power supply and a secondary, said controller comprising:

sensing means operable to determine the values of operating parameters of said motor;

processing means receiving said values and determining therefrom an updated frequency for said power supply; and adjustment means responsive to said processing means to alter the frequency of said power supply to said updated frequency so as to alter the thrust developed by said motor such that in a steady-state condition, said motor develops thrust having a magnitude equal or near to its maximum thrust capability.

According to another aspect of the present invention there is provided a method of controlling a linear induction motor having a primary connected to a variable frequency power supply and a secondary, said controller comprising the steps of:

(i) measuring values of operating parameters of said motor;

(ii) using said values to calculate an updated frequency for the power supply; and (iii) altering the frequency of the power supply to the calculated updated frequency value so as to alter the thrust developed by the motor, such that the motor in a steady-state condition will develop thrust having a magnitude near to or at its maximum thrust capability.

Preferably, the controller uses an iterative process to determine the updated frequency for the power supply.

In one embodiment, the adjustment means is conditioned by the processing means to alter the frequency incrementally such that linear induction motor approaches its maximum thrust capability in increments. This is achieved by initially selecting a predetermined supply voltage frequency and measuring the sensor outputs to determine the thrust output of the linear induction motor at that initial frequency. The frequency is then incremented by a predetermined amount and the thrust at the incremented frequency is calculated. If the new thrust is greater than the previous thrust, the same process is performed until the thrust reaches a point near to or at its maximum thrust point.

However, if the incremented frequency results in a thrust being developed by the motor which is less than the previous thrust, the initial frequency is decremented. Provided the thrust versus frequency curve has only one maximum, the adjustment of the frequency in this manner will result in the linear induction motor developing thrust near to or at its maximum thrust point.

In another embodiment, the processing means uses the output of the sensors to solve a mathematical model representing the linear induction motor to determine a power supply frequency that should cause the linear induction motor to develop maximum thrust. The adjustment means in turn adjusts the supply voltage frequency to that calculated value and the processing means measures the output of the sensors at the new frequency. The processing means performs the same calculations to determine a revised frequency and the process is repeated so that the linear induction motor develops thrust near to or at its maximum thrust point in the steady-state condition at a given motor speed.

It is preferred that the sensing means monitors the speed of the primary with respect to the secondary and at least one of the voltage and current supplied to the primary by the power supply. These measured values are used in the mathematical model to determine the supply voltage frequency.

The present invention provides advantages in that regardless of changes in operating conditions of the linear induction motor primary and changes in the construction and effective resistance of the linear induction motor secondary, the linear induction motor is operated so that it develops thrust near to or at its maximum thrust point at any given motor speed. This allows the size of the linear induction motor primary to be minimized while ensuring that the linear induction motor develops sufficient thrust for all possible load conditions.

BRIEF DESCRIPTION OF THE DRAWINGS

Preferred embodiments of the present invention will now be more fully described with reference to the accompanying drawings wherein.

DESCRIPTION OF THE PREFERRED EMBODIMENTS

As is known to those of skill in the art, linear induction motors (LIMs) comprise a primary and a secondary. In one configuration, the primary is mounted on the chassis of a vehicle movable along the rails of a track. The primary has a plurality of windings which, when energized, generate an electric field. The linear induction motor secondary or reaction rail extends between the rails of the track and is positioned so that a small air gap between the primary on the vehicle and the secondary exists. The small air gap is necessary to ensure that the secondary remains in the high flux region of the electric field generated by the primary. The electric field causes a current to be induced in the secondary which results in a directional thrust being applied to the secondary. Since the secondary is fixed between the rails of the track, the thrust is applied to the primary and is transferred to the vehicle causing it to move along the track. It is desired to ensure that the thrust developed by the LIM at a given speed remains at or near to its maximum capability at that given speed to ensure that the LIM develops sufficient thrust for all possible load conditions while allowing the size and weight of the LIM primary to be minimized.

One method of controlling the thrust developed by the LIM is to control the frequency of the power supplied to the LIM. By altering the frequency of the power supply, the thrust output of the LIM can be changed. Typically, the vehicle taps into a dc power supply running alongside the rails of the track. The dc power is fed to an inverter which converts the dc power to ac power. The inverter receives control signals from a controller and adjusts the frequency of the ac power in accordance with the received control signals. Thus, the controller can adjust the thrust output of the LIM by causing the inverter to alter the frequency of the power supply applied to the primary.

Figure 1:
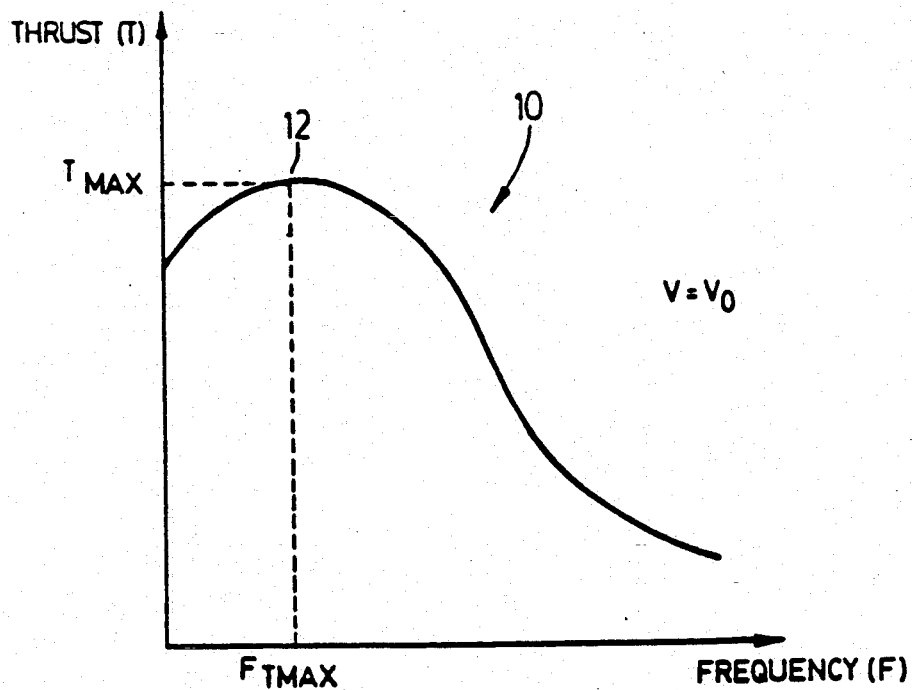
FIG. 1 shows a portion of a thrust versus frequency characteristic curve of a polyphase linear induction motor.
Figure 2:
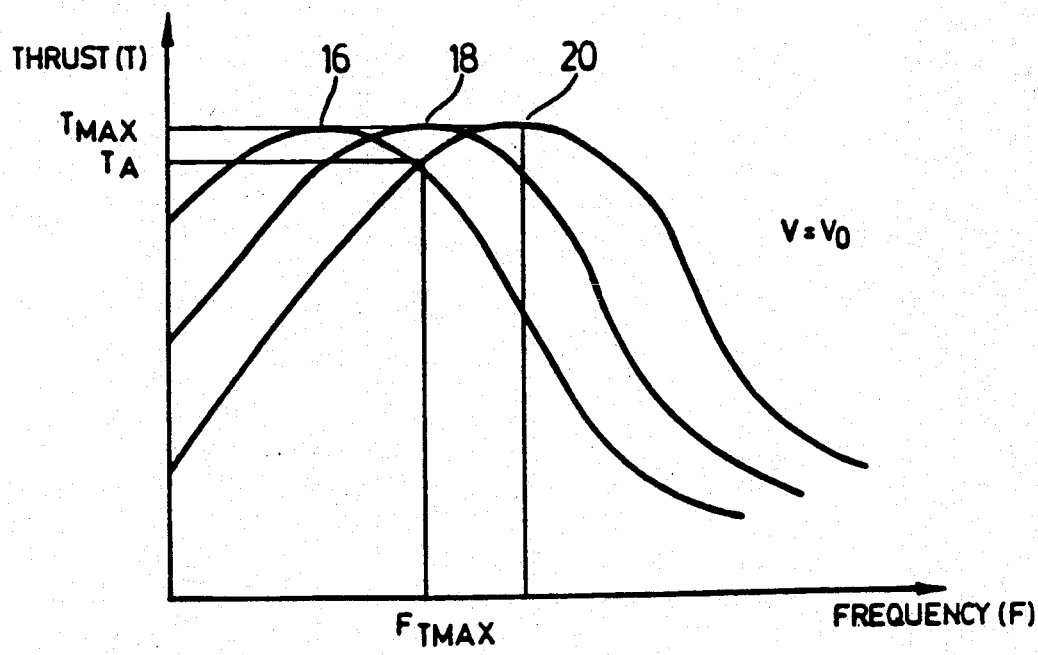
FIG. 2 shows a plurality of superimposed portions of thrust versus frequency characteristic curves of a polyphase linear induction motor primary at different operating conditions.

To clarify the operation of the present controller for a linear induction motor (LIM) primary, a brief description of the prior art method of controlling a linear induction motor will now be provided with reference to FIGS. 1 and 2.

FIG. 1 shows a curve 10 representing the thrust developed by a linear induction motor (LIM) versus the frequency of its power supply while operating at a particular speed $v_o$. As can be seen, the thrust versus frequency curve 10 reaches a maximum at point 12 at which the LIM develops maximum thrust $T_{max}$ at speed $v_o$. In order to make the best use of space and weight, LIMs are often operated near to or at the maximum thrust point 12 of their characteristic curve for a given motor speed.

Conventional linear induction motors are controlled using a controller which determines the frequency of the supply voltage to be applied to the LIM primary. These controllers include a look-up table which stores the frequencies $F_{Tmax}$ at which maximum thrust is produced by the LIM for various motor speeds. In operation, the controller provides signals to the inverter so that the supply voltage applied to the LIM primary is at a frequency equivalent to the frequency value $F_{Tmax}$ stored in the look-up table corresponding to the detected operating speed of the linear induction motor. In an ideal environment, the LIM will develop maximum thrust at this frequency.

However, the thrust versus frequency characteristic of the linear induction motor is dependant upon a number of changing factors including temperature, power supply voltage, reaction rail construction, etc. and thus, the maximum thrust $T_{max}$ will not be developed by the LIM at the stored frequency $F_{Tmax}$ in the look-up table when these factors differ from their nominal values encountered at the time the look-up table was constructed.

FIG. 2 illustrates the above and shows three different but possible thrust versus frequency characteristics 16,18,20 for a particular linear induction motor operating at a given operating speed $v_o$. Curve 18 represents the characteristic curve of the linear induction motor under nominal conditions. The curves 16 and 20 represent possible shifts in characteristic curve 18 which may occur due to changes in one or more of the motor parameters such as for example, the reaction rail temperature, the reaction rail construction or the supply voltage.

When using a prior art controller, if the speed of the linear induction motor primary relative to the secondary is detected as being equal to $v_o$, the controller examines the look-up table to determine the frequency that the supply voltage to the LIM primary should be set at so that the LIM develops maximum thrust $T_{max}$. In this case the controller sets the supply voltage frequency to the value equal to $F_{Tmax}$.

However, when the linear induction motor is operating in conditions other than the nominal conditions, the characteristic curve of the linear induction motor at the given speed $v_o$ shifts as represented by curves 16 or 20. During operation of the linear induction motor, if a shift in the characteristic curve occurs and the linear induction motor is detected as operating at the given speed $v_o$, the controller still conditions the inverter to supply the LIM primary with power having a frequency set at the value $F_{Tmax}$. In this case with the supply voltage set at the frequency $F_{Tmax}$, the LIM develops thrust having a magnitude equal to $T_A$, less than the maximum thrust value $T_{max}$. Depending on the amount of the shift of the characteristic curve from the curve 18 at nominal operating conditions, the difference between the actual thrust $T_A$ developed by the LIM and the maximum thrust $T_{max}$ that the LIM is capable of developing at the given motor speed may be substantial.

To overcome the problems associated with the above described prior art method of controlling a LIM, the present controller for a linear induction motor has been developed. The present controller implements an adaptive control method to ensure that the linear induction motor develops thrust within an arbitrarily small range of its maximum thrust capability at a given motor speed and regardless of changes in motor operating conditions.

Figure 3:
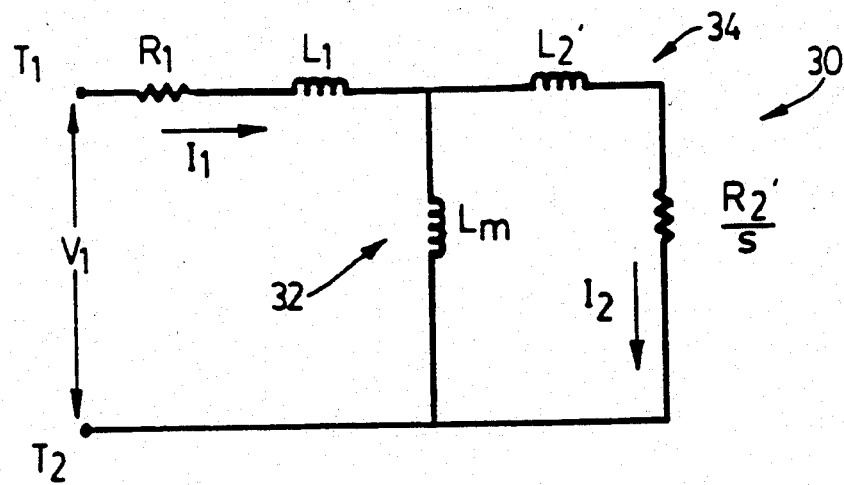
FIG. 3 shows an equivalent circuit diagram of a polyphase linear induction motor.

Before describing the present controller, a brief discussion of linear induction motor theory will be provided setting forth the basis on which the various embodiments of the present controller operate. Referring now to FIG. 3, an equivalent circuit 30 for a linear induction motor is shown. As can be seen, the equivalent circuit 30 includes a pair of terminals $T_1$ and $T_2$ across which a supply voltage $V_1$ is applied. A resistive component $R_1$, representing the winding resistance or so-called "copper losses" of the LIM primary, is connected in series with an inductive component $L_1$, representing the LIM primary winding inductance leakage. A current $I_1$ is shown flowing from the one terminal $T_1$ through the resistive and inductive components $R_1$ and $L_1$ respectively, as a result of the applied voltage $V_1$. The values of the inductance and resistive components $L_1$ and $R_1$ may be experimentally determined and, although some variation of the values will occur from their nominal values at different motor conditions, these variations are small and thus, for most purposes the components $L_1$ and $R_1$ may be treated as constants. If greater accuracy is required, these values can be measured "on the fly" as the motor is operating.

Inductive component $L_1$ is further connected to two different circuits 32 and 34, both of which are in turn connected to the other terminal $T_2$. One of the circuits 32 includes a single inductive component $L_m$ representing the magnetizing inductance of the linear induction motor. The other circuit 34 includes an inductive component $L_2$, representing the inductance of the LIM secondary, in series with a resistive component, $$\frac{R_2'}{s}$$

representing the resistance of the LIM secondary and the load placed on the linear induction motor. A current $I_2$ is shown flowing through the circuit 34 to the other terminal $T_2$.

As is known to those of skill in the art, the slip s of the linear induction motor can be determined from the following equation:

$$s = 1 - \frac{\text{Velocity}}{2 \times \text{Freq} \times \text{Pole Pitch}} \qquad \text{Equation 1}$$

The series combination of $L_2$ and $$\frac{R_2'}{s}$$

represents the effective impedance of the linear induction motor and is dependent on the speed v of the linear induction motor, the load placed on the linear induction motor, the resistivity of the LIM primary windings and the resistivity of the LIM secondary.

An equation for determining the thrust T developed by the linear induction motor is identified below and can be derived from the equivalent circuit of FIG. 3.

$$\text{Thrust} = \frac{I_2^2 R_2' \times \text{Number of Phases}}{s \times 2 \times \text{Freq} \times \text{Pole Pitch}} \qquad \text{Equation 2}$$

Given equations 1 and 2, and by knowing the values of the variables and constants in the equations, the slip s and hence, the thrust, of a linear induction motor can be determined at a given velocity.

Alternatively, the thrust output of the LIM can be estimated quite accurately using an expression which includes terms whose values can be measured at the terminals of the LIM primary. This facilitates calculating the thrust and reduces the time necessary to perform the calculations. This expression is identified below as equation 3:

$$\text{Thrust} = \frac{P_{input} - 3I_1^2 R_1}{2 \times \text{Freq} \times \text{Pole Pitch}} \quad \text{Equation 3}$$

Figure 4:
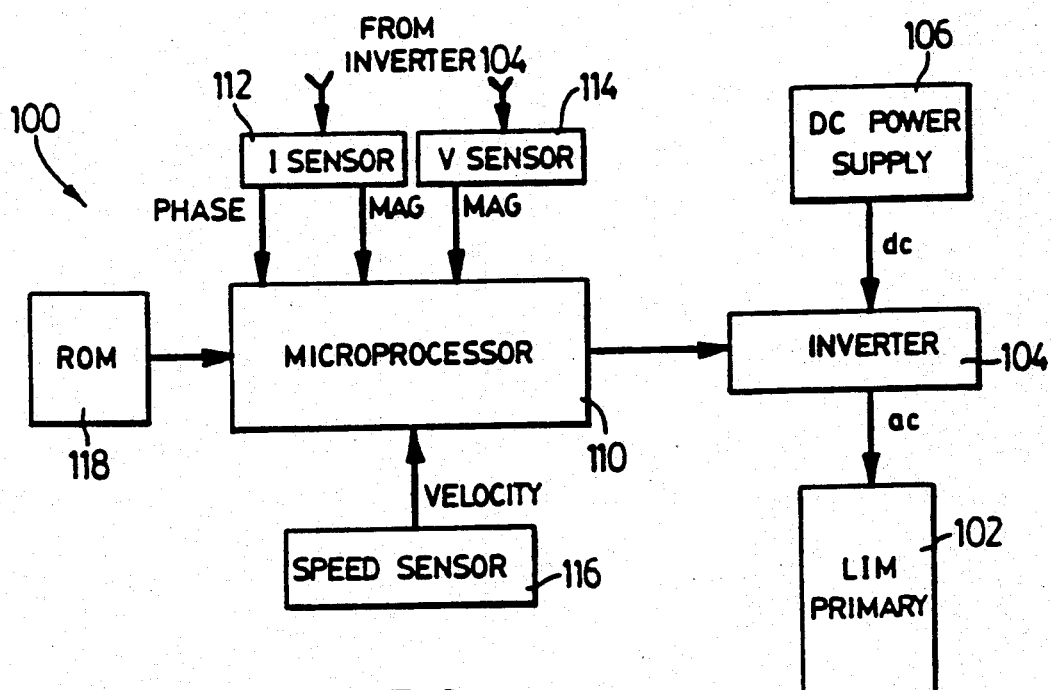
FIG. 4 shows a block diagram of a controller for a linear induction motor primary.

Referring now to FIG. 4, an embodiment of a controller 100 for a linear induction motor in accordance with the present invention is shown. The controller 100 performs computations using equation 3 to determine the thrust developed by the LIM and controls the power supply to the LIM primary 102 of based on the results of the computations as will be described. As can be seen, the controller 100 is connected to an inverter 104 which itself is connected between a direct current (dc) power supply 106 and a linear induction motor primary 102. As is known to those of skill in the art, the inverter converts the dc supply to an alternating current (ac) supply having a frequency dependent upon control signals received by the inverter 104. In this case, the control signals are generated by the controller 100 as will be described, and thus, the controller 100 determines the frequency of the ac supply voltage applied to the LIM primary 102.

The controller 100 includes a microprocessor 110 receiving input signals from a current (I) sensor 112 and a voltage (V) sensor 114. The sensors 112 and 114 respectively monitor the ac output of the inverter 104 supplied to the LIM primary 102. The output of sensor 112 applied to the microprocessor 110 represents the phase and magnitude of the current supplied to the LIM primary 102 via the inverter 114 while the output of the sensor 114 represents the magnitude of the voltage supplied to the LIM primary 102 via the inverter 104. The microprocessor 110 also receives input signals from a speed sensor 116 representing the relative speed of the LIM primary 102 with respect to the LIM secondary. A Read Only Memory (ROM) 118 stores the operating program for the microprocessor 110 along with predetermined constant data relating to physical parameters of the LIM primary, namely the values of $R_1$ and the pole pitch as well as an initial starting frequency value.

Figure 5:
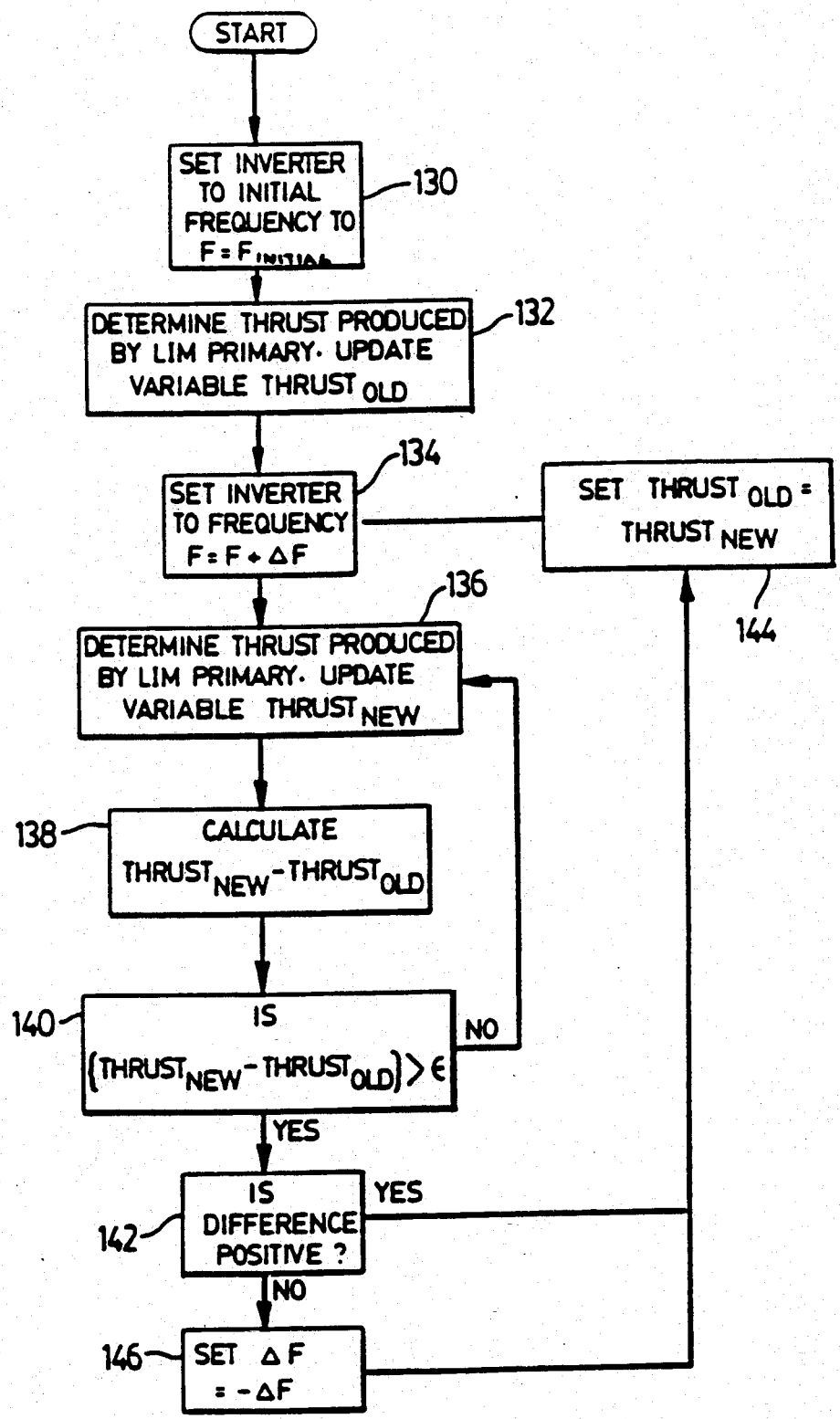
FIG. 5 is a flow chart illustrating one mode of operation of the controller illustrated in FIG. 4.

In one mode of operation, the microprocessor solves equation 3 to adjust dynamically the frequency of the ac power supplied to the LIM primary 102 by providing appropriate control signals to the inverter 104 so that the LIM develops thrust having a magnitude equal to or close to that of its maximum thrust capability at the detected speed of the LIM. The operation of the controller 100 in this mode will now be described with reference to FIGS. 4 and 5.

Initially, when it is desired to provide power to the LIM primary 102 to operate the LIM, the controller 100 receives operating information from a control source such as an operator console on the vehicle on which the LIM primary is located. At this time, the microprocessor 110 accesses the ROM 118 and retrieves the stored value in the ROM representing the predetermined initial starting frequency $F_{initial}$ for the ac power to be supplied to the LIM primary 102. The microprocessor uses the stored initial frequency value and applies a control signal to the inverter 104 which in turn converts the dc voltage received from the supply 106 to an ac voltage having a frequency equal to the predetermined initial frequency $F_{initial}$. This operation is represented by block 130 in FIG. 5.

Once the LIM primary 102 receives the ac supply, the LIM develops thrust and the vehicle on which the LIM primary is located begins to move along the track. While this is occurring, the sensors 112 and 114 monitor the output of the inverter 104 and generate output signals which are supplied to the microprocessor 110. At the same time, the speed sensor 116 determines the relative speed of the LIM primary 102 with respect to the LIM secondary and supplies a signal to the microprocessor 110 representing the detected speed of the LIM.

Once the microprocessor receives the signal from the sensors 112 to 116, the microprocessor retrieves the value of $R_1$ stored in the ROM. The microprocessor then uses the detected values of the current and voltage applied to the LIM primary 102 to calculate the power input to the LIM primary $P_{input}$. Using the calculated value of $P_{input}$, the retrieved value of $R_1$ and the detected current value I, the microprocessor solves equation 3 to determine the thrust developed by the LIM. The value representing the calculated thrust is stored by the microprocessor 110 in a variable $THRUST_{OLD}$. The above described steps performed by the microprocessor 110 to determine the thrust developed by the LIM primary 102 are represented by block 132.

After this has been done, the microprocessor 110 adjusts its output to the inverter 104 causing the inverter to change the frequency of the power supplied to the LIM primary 102 so that the initial frequency $F_{initial}$ is incremented by a value $\Delta F$ as indicated at block 134. At this time, the microprocessor 110 examines the output of the sensors 112 to 116 and solves equation 3 as described above using the updated sensor output to determine the thrust developed by the LIM at the new frequency, $F_{initial}+\Delta F$. The new LIM thrust calculated by the microprocessor is stored by the microprocessor 110 in a variable $THRUST_{NEW}$ (block 136).

The microprocessor 110 then examines the initial and new thrust values stored therein and calculates the difference between the variables $THRUST_{NEW}$ and $THRUST_{OLD}$ (block 138). The difference value is compared to a predetermined value $\epsilon$ by the microprocessor 110 as indicated at block 140 to determine if the absolute value of the difference is less than the predetermined value $\epsilon$. If the absolute value of the difference between the variables is greater than the value $\epsilon$, the microprocessor 110 examines the difference value to determine if the difference value is positive or negative (block 142).

If the microprocessor 110 determines that the difference between the variables $THRUST_{NEW}$ and $THRUST_{OLD}$ is greater than $\epsilon$ and is positive, (i.e. the thrust has increased by more than $\epsilon$) the microprocessor 110 updates the variable $THRUST_{OLD}$ so that it equals the value of variable $THRUST_{NEW}$ (block 144). Once this has been done, the microprocessor 110 proceeds to block 134 and adjusts its output to the inverter 104 so that the frequency of the power supplied to the LIM primary is incremented once again by an amount equal to $\Delta F$. After this has been done, the new thrust developed by the LIM is calculated by the microprocessor 110 (block 136) and stored in the variable $THRUST_{NEW}$ and the new thrust is compared with the updated variable $THRUST_{OLD}$ (block 138). The microprocessor 110 continues through this sequence of steps until the absolute value of the difference between the new thrust developed by the LIM after an incremental frequency change and the value of the variable $THRUST_{OLD}$ stored in the microprocessor 110 is detected as being less than the predetermined value $\epsilon$.

On the other hand, if the difference between the value of the variables $THRUST_{OLD}$ and $THRUST_{NEW}$ is determined by the microprocessor 110 to be negative at block 142, the microprocessor changes the incremental frequency value $\Delta F$ from positive to negative value (block 146). Once this is done, the microprocessor 110 proceeds to block 144 and sets $THRUST_{OLD}$ equal to $THRUST_{NEW}$ and then adjusts its output to the inverter 104 so that the frequency of the power supplied to the LIM primary 102 is decremented by an amount equal to $\Delta F$ at block 134. After this has been done, the new thrust developed by the LIM is calculated by the microprocessor 110 (block 136) at the reduced frequency and the new thrust is compared with the updated variable $THRUST_{OLD}$ (blocks 138 and 140). The microprocessor 110 continues through this sequence of steps until the absolute value of the difference between the value of the variable $THRUST_{OLD}$ stored in the microprocessor and the new thrust developed by the LIM after a decremental frequency change, is detected as being less than the predetermined value $\epsilon$ (block 140) or the difference between $THRUST_{NEW}$ and $THRUST_{OLD}$ is negative (block 146).

When the absolute value of the difference between the new thrust developed by the LIM after a frequency change and the value of the variable $THRUST_{OLD}$ is determined by the microprocessor 110 to be less than the predetermined value $\epsilon$ at block 140, the microprocessor 110 does not change the frequency output of the inverter 104 and does not update the $THRUST_{OLD}$ variable. However, the microprocessor 110 proceeds to block 136 and again calculates the thrust developed by the LIM using the output of the sensors 112 to 116 and the information stored in the ROM. Thus, the microprocessor 110 maintains the frequency of the power supplied to the LIM at an unchanged level as long as the thrust developed by the LIM primary 102 as calculated by the microprocessor 110 does not change by an amount greater than the predetermined value $\epsilon$ different from its previous calculated value stored in the variable $THRUST_{OLD}$.

Figure 6:
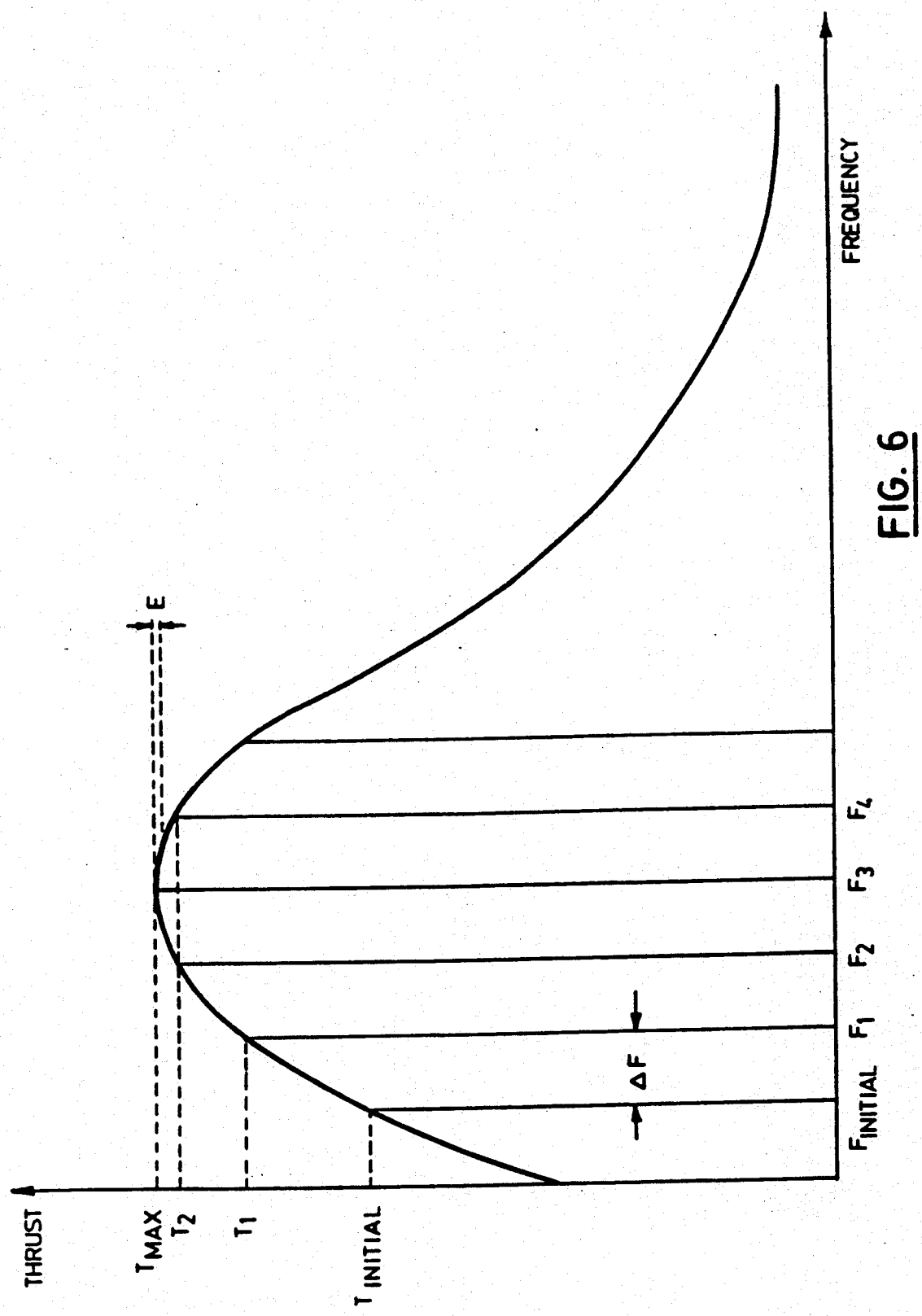
FIG. 6 shows a portion of a thrust versus frequency characteristic curve of a linear induction motor controlled by the controller illustrated in FIG. 4.

FIG. 6 shows the change in thrust developed by the LIM as the microprocessor 110 adjusts the frequency output of the inverter 104 from the initial frequency $F_{initial}$ by increments $\Delta F$ in an attempt to stabilize the LIM thrust output at its maximum capability $T_{max}$ for a given velocity. Initially, and as described above, the microprocessor 110 applies signals to the inverter 104 causing it to set the frequency of the power supplied to the LIM primary 102 to the initial frequency $F_{initial}$ as determined by the value stored in the ROM 118. The LIM in turn develops thrust having a magnitude equal to $T_{initial}$.

Once this is done, the microprocessor 110 adjusts its output to the inverter 104 causing the inverter to sets its frequency output at an increased value $F_1 = F_{initial} + \Delta F$. The microprocessor 110 again determines the thrust developed by the LIM at the new frequency $F_1$ and stores the calculated thrust value $T_1$ in the variable $THRUST_{NEW}$.

The difference between the $THRUST_{NEW}$ and the $THRUST_{OLD}$ variables is determined and compared to the predetermined value $\epsilon$. As the difference between values $T_1 - T_{initial}$ is, in this example, larger than the value $\epsilon$, the value of the $THRUST_{OLD}$ variable is updated to equal that of the $THRUST_{NEW}$ variable. The microprocessor 110 then adjusts its output to the inverter 104 causing the inverter to set its frequency output at another increased value $F_2 = F_{INITIAL} + 2\Delta F$. The microprocessor once again calculates the thrust $T_2$ developed by the LIM at the new frequency, $F_2$.

As can be seen, the microprocessor 110 continues to operate the inverter 104 so that its frequency output is increased when the thrust output of the LIM primary 102 increases. Once the thrust output of the LIM primary 102 is detected as increasing or decreasing by an amount less than the value $\epsilon$ from its previous thrust output after an incremental frequency change, the microprocessor 110 stabilizes the frequency output of the inverter, as the thrust output of the LIM is considered to be within a small predefined range of its maximum thrust capability for its given velocity.

If the microprocessor 110 increases the frequency output of the inverter 104 and the new thrust developed by the LIM primary 102 is detected as being less than the previous thrust, the microprocessor 110 determines that it has "overshot" the maximum thrust point. As described previously, the microprocessor 110 begins to reduce the frequency output of the inverter 104 in order to attempt to operate the LIM at its maximum thrust capability point.

Although, the controller has been described as using equation 3 to determine the thrust output of the LIM, it should be realized that equation 1 and 2 in conjunction with the equivalent circuit illustrated in FIG. 3 may be used to calculate the thrust developed by the LIM. It should also be realized that the magnitude of the frequency increments can be controlled by the microprocessor so that the increments become smaller as the controller approaches the maximum thrust point of the LIM at the operating speed of the motor.

In a second mode of operation of the controller 100, equation 3 is differentiated and rewritten to find directly the frequency at which maximum thrust $T_{max}$ will be produced by the LIM. The frequency for maximum thrust is determined by maximizing equation 4 below in conjunction with the equivalent circuit illustrated in FIG. 3:

$$T = \frac{3I_2^2 R_2'}{2 \times \text{Freq} \times \text{Pole Pitch}}$$

Figure 7:
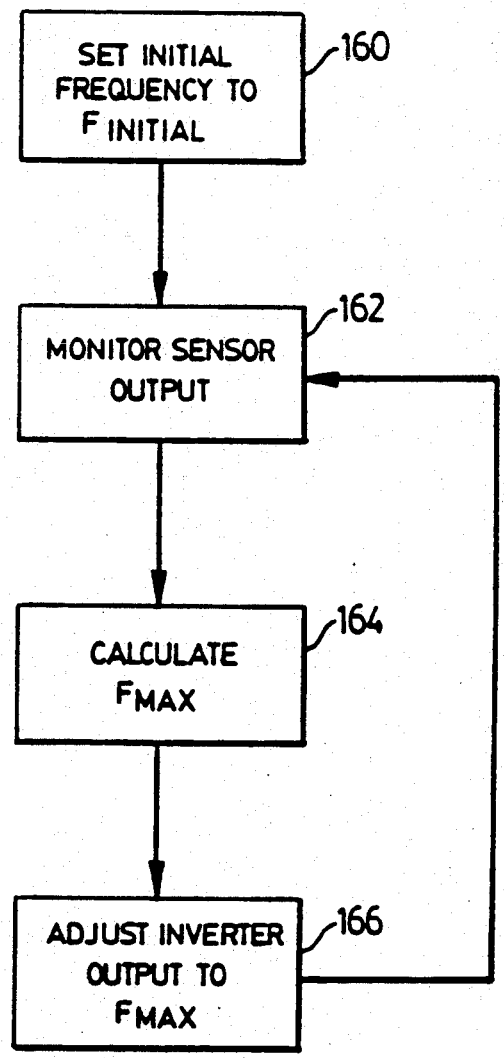
FIG. 7 is a flow chart illustrating another mode of operation of the controller illustrated in FIG. 4.

Maximization of equation is achieved by differentiating equation 4 with respect to frequency; setting the equation equal to zero and solving the equation using numerical techniques such as for example Newton's method. Accordingly, in this mode of operation, the microprocessor 110 calculates a specific frequency value for the inverter 104 as opposed to updating the frequency using preset incremental or decremental levels. The operation of the controller 100 in this mode will now be described with reference to FIG. 7.

As in the previous embodiment, when the LIM is being initially operated, the microprocessor 110 retrieves the initial frequency value $F_{initial}$ stored in the ROM 118 and adjusts its output to the inverter 104 so that the inverter 104 conditions its ac output to the initial frequency (block 160).

The microprocessor 110 then measures the output of the sensors 112 to 116 representing the LIM primary input current and voltage $I_1$ and $V_1$ respectively and the motor speed and derives the values of $I_2$ and $R_2'$ from the equivalent circuit shown in FIG. 3 (block 162). The microprocessor 110 then solves equation 4 to yield $F_{max}$, this being the frequency at which the LIM should produce maximum thrust (block 164).

Once the frequency $F_{max}$ is calculated, the microprocessor 110 adjusts its output to the inverter 104 so that the inverter adjusts the frequency of the power supplied to the LIM primary 102 to correspond to the calculated frequency $F_{max}$ (block 166). The microprocessor 110 then loops back to block 162 and again measures the LIM primary input current and voltage and the motor speed. These new measured values are again used by the microprocessor 110 to derive values for $I_2$ and $R_2'$ for substitution into equation 4 which is solved again for a new frequency value $F_{max}$. This process is repeated in an iterative manner with the frequency of the power supply being adjusted after each iteration. Since the microprocessor 110 continuously updates its output to the inverter 104, the inverter operates in a manner so that the frequency of the power supplied to the LIM primary 102 is such that the LIM primary 102 always develops thrust having a magnitude close to or equal to its maximum thrust capability at the given velocity of the LIM.

In certain circumstances, it is desired to operate the LIM primary in a constant current mode. As is known to those of skill in the art, in this mode of LIM primary operation, a constant input current is applied to the LIM primary and the input voltage is varied as the power requirements of the LIM primary change. Operation of the LIM primary in this mode allows further simplification of the equivalent circuit illustrated in FIG. 3.

Figure 8A:
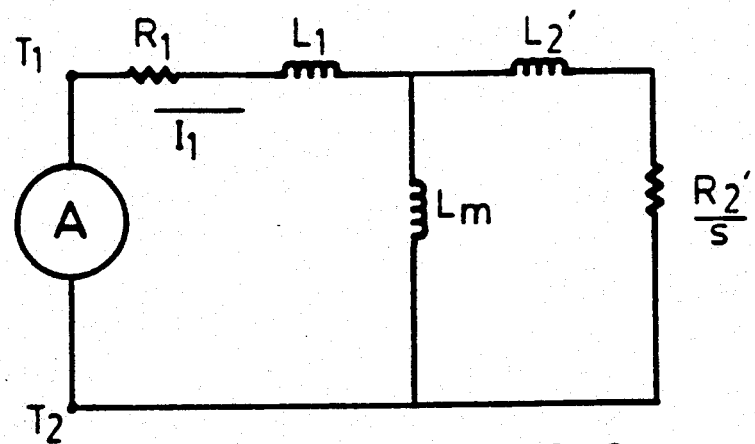
FIGS. 8a to 8c show equivalent circuit diagrams of a polyphase linear induction motor operating in a constant current mode.
Figure 8B:
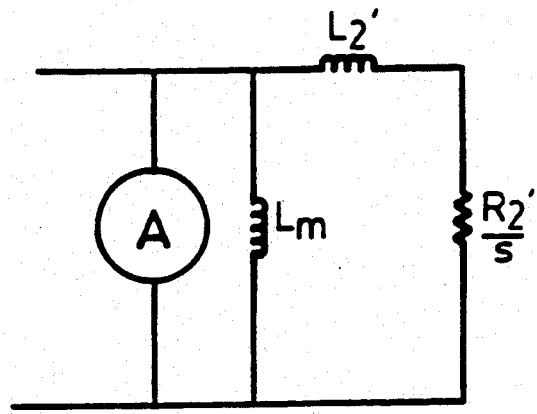

FIG. 8(a) shows the equivalent circuit of FIG. 3 with a constant current supply A connected across its terminals $T_1$ and $T_2$ respectively. For the purposes of calculating thrust, the components $R_1$ and $L_1$ are treated as constants with a negligible effect, allowing the circuit to be simplified to that shown in FIG. 8(b) by movement of the current source A. As is understood by those of skill in the art, the circuit of FIG. 8(b) can be transformed into the simplified equivalent circuit shown in FIG. 8(c).

Figure 9:
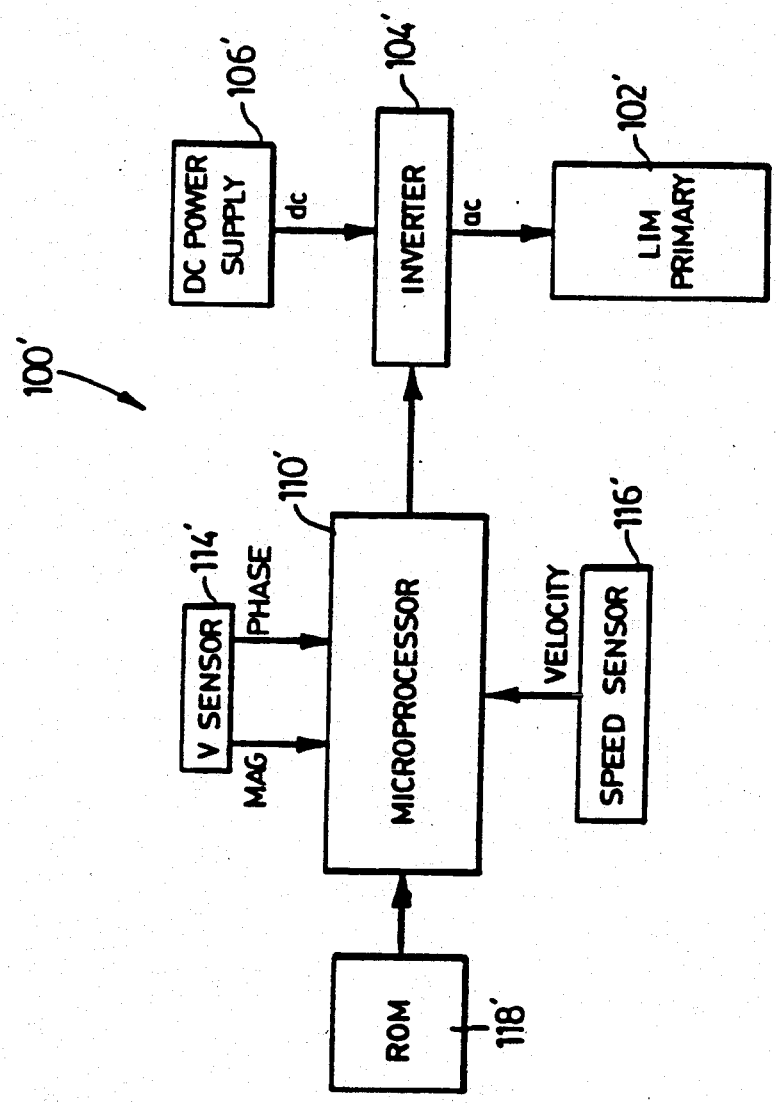
FIG. 9 shows a block diagram of a controller for a linear induction motor operating in a constant current mode.

FIG. 9 shows a block diagram of another embodiment of a controller 100', particularly useful when the LIM primary 102 is to be operated in a constant current mode. In this embodiment, like reference numerals will be used to indicate like components with a "'" added for clarity. Since in this embodiment the LIM primary 102' is supplied with a constant current, the microprocessor 110' no longer requires the current sensor input. Instead, the microprocessor 110' requires magnitude and phase inputs from the voltage sensor 114' and speed input from the speed sensor 116'. The ROM memory 118' contains the program and constant data for use by the microprocessor 110' in calculating the frequency at which maximum thrust will be produced by the LIM primary 102'. This calculated frequency is output by the microprocessor 110' as a control signal to inverter 104'.

Figure 8C:
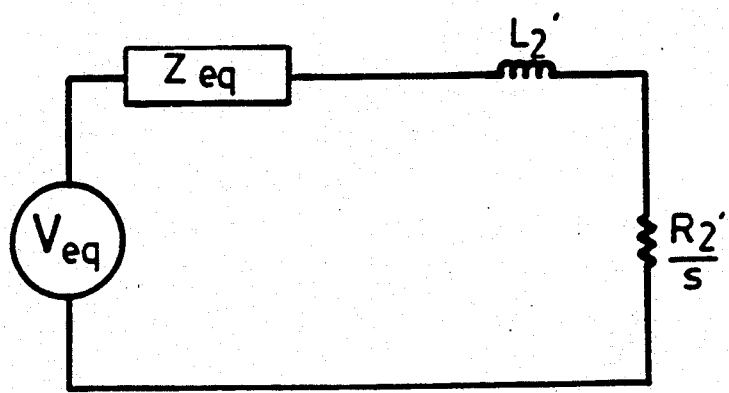

In this embodiment, the LIM primary may be modeled by the equivalent circuit shown in FIG. 8(c). As known by those of skill in the art, maximum thrust will be produced by the LIM at the operating conditions under which it absorbs maximum power. Using the equivalent circuit of FIG. 8(c) and the maximum power theorem, it can be determined that maximum power is absorbed by the LIM when $$|Z_{eq}| = \left|\frac{R_2'}{s}\right|.$$

The microprocessor 110' therefore measures the input voltage, calculates the slip s of the LIM in the manner previously described and uses these values to solve for $R_2'$. Once $R_2'$ is determined, the microprocessor 110 solves for the frequency at which $$|Z_{eq}| = \left|\frac{R_2'}{s}\right|.$$

The microprocessor 110' then adjusts its output to the inverter 104' causing the inverter 104' to set its output frequency equal to the calculated frequency. The microprocessor 110' as in the previous embodiment, performs these measurements and calculations on an iterative basis to determine the frequency at which maximum thrust should be developed by the LIM primary.

It should be understood that in each of the above embodiments, the interval between which the microprocessor completes one iteration and commences the next is selected to ensure that the LIM primary has time to settle at its new operating point. This is achieved by ensuring that the time step between successive iterations is greater than the time constant of the LIM. This settling time is typically quite short in duration, provided that the amount of the change in the power supply frequency is not large. It should also be realized that if the LIM primary does not have time to settle at its new operating point, which may occur when operating at steep portions of the thrust versus frequency characteristic curve, the microprocessor may overshoot or undershoot the frequency at which maximum thrust will occur. However as the motor settles during later iterations where the characteristic curve is not as steep, overshooting and undershooting will not occur to any great extent.

The present controller begins to adjust the frequency of the power supplied to the LIM primary 102 as soon as the LIM is operated so that the LIM is conditioned to generate thrust new to or at its maximum thrust capability throughout its course of operation.

As should be apparent to one of skill in the art, the present method and controller for a linear induction motor primary provides advantages in that the LIM primary is supplied with ac power which causes it to develop thrust having a magnitude near to or at its maximum capability at any given motor speed regardless of changes in operating conditions. This allows the design of the LIM primary to be optimized while ensuring that the LIM is capable of developing sufficient thrust for all possible load conditions.

We claim:

1. A controller for a linear induction motor having a primary connected to a power supply and a secondary, said controller controlling the frequency of power supplied to said primary by said power supply and comprising:

sensing means measuring at least one of the voltage and current supplied to said primary by said power supply and the speed of said primary relative to said secondary;

processing means receiving the measured values from said sensing means and calculating the thrust developed by said motor at the frequency setting of said power supply by solving the equation:

$$\text{Thrust} = \frac{P_{input} - 3I_1^2 R_1}{2 \times \text{Freq} \times \text{PolePitch}}$$

wherein $P_{input}$ is the power supplied to said primary, $I_1$ is the current supplied to said primary, $R_1$ is the winding resistance of said primary and Freq is the frequency setting of said power supply, said processing means comparing the calculated thrust with a thrust calculated by said processing means at the previous frequency setting of said power supply and determining an updated frequency setting by incrementing or decrementing the frequency setting depending on the difference between the compared thrust values; and adjustment means responsive to the processing means to alter the frequency setting of the power supply to said updated frequency so as to alter the thrust developed by said motor such that in a steady state condition at a given motor speed, said motor develops thrust at or near to its maximum thrust capability at that motor speed.

2. A controller as defined in claim 1 wherein said processing means includes a memory storing an initial frequency setting and wherein when said motor is initially operated, said adjustment means sets the frequency of said power supply to said initial frequency setting, said processing means calculating the thrust developed by said motor at said initial frequency setting and then incrementing the initial frequency setting by said predetermined amount to determine said updated frequency setting, said processing means calculating the thrust developed by said motor at said updated frequency and comparing the difference between the calculated thrusts to determine the next updated frequency.

3. A controller as defined in claim 2 wherein the magnitude of the incremental or decremental frequency setting changes remain constant throughout the entire operation of said controller.

4. A controller as defined in claim 3 wherein said processing means maintains the frequency setting at a constant value when the magnitude of the difference between the calculated thrust before and after each updated frequency setting change is less than a predetermined value.

5. A controller as defined in claim 1 wherein said processing means maintains said updated frequency at a constant value when said magnitude of the difference between the calculated thrust before and after each updated frequency change is less than a predetermined value.

6. A controller as defined in claim 1 wherein said motor is operated in a constant current mode, said sensing in the means measuring the voltage and phase of the power supplied to said primary.

7. A controller for a linear induction motor having a primary connected to power supply and a secondary, said controller controlling the frequency of power supplied to said primary by said power supply and comprising:

sensing means measuring at least one of the voltage and current supplied to said primary by said power supply and the speed of said primary relative to said secondary;

processing means receiving the measured values from said sensing means and calculating the thrust developed by said motor at the frequency setting of said power supply by solving the equation:

$$\text{Thrust} = \frac{I_2^2 R_2' \times \text{Number of Phases}}{s \times 2 \times \text{Freq} \times \text{Pole Pitch}}$$

wherein s is the slip of the motor and is equal to $$s = 1 - \frac{\text{Velocity}}{2 \times \text{Freq} \times \text{Pole Pitch}},$$

said processing means comparing the calculated thrust with the thrust calculated by said processing means at the previous frequency setting of said power supply and determining an updated frequency setting by incrementing or decrementing the frequency setting depending on the difference between the compared thrust values; and adjustment means responsive to the processing means to alter the frequency setting of the power supply to said updated frequency so as to alter the thrust developed by said motor such that in a steady state condition at a given motor speed, said motor develops thrust at or near to its maximum thrust capability at that motor speed.

8. A controller as defined in claim 7 wherein said processing means includes a memory storing an initial frequency setting and wherein when said motor is initially operated, said adjustment means sets the frequency of said power supply to said initial frequency setting, said processing means calculating the thrust developed by said motor at said initial frequency setting and then incrementing the initial frequency setting by said predetermined amount to determine said updated frequency setting, said processing means calculating the thrust developed by said motor at said updated frequency and comparing the difference between the calculated thrusts to determine the next updated frequency.

9. A controller as defined in claim 8 wherein the magnitude of the incremental or decremental frequency setting changes remain constant throughout the entire operation of said controller.

10. A controller as defined in claim 9 wherein said processing means maintains the frequency setting at a constant value when the magnitude of the difference between the calculated thrust before and after each updated frequency setting change is less than a predetermined value.

11. A controller for a linear induction motor having a primary connected to a power supply and a secondary, said controller controlling the frequency of power supplied to said primary by said power supply and comprising:

sensing means measuring at least one of the voltage and current supply to said primary by said power supply and the speed of said primary relative to said secondary;

processing means receiving said measured values from said sensing means and calculating an updated frequency for said power supply maximizing the equation $$\text{Thrust} = \frac{3I_2{}^2 R_2'}{2 \times \text{Freq} \times \text{Pole Pitch}}$$

by differentiating the equation with respect to frequency, setting the differentiated equation equal to zero and solving the equation to determine said updated frequency; and adjustment means responsive to said processing means to alter the frequency of said power supply to said updated frequency so as to alter the thrust developed by said motor such that in a steady state condition at a given motor speed, said motor develop thrust having magnitude equal or near to its maximum thrust capability at that speed.

12. A controller as defined in claim 11 wherein said processing means solves the equation iteratively on a substantially continuous basis to determine said updated frequency.

13. A controller as defined in claim 1 wherein said processing means is microprocessor based and said adjustment means is an inverter.

14. A controller as defined in claim 7 wherein said processing means is microprocessor based and said adjustment means is an inverter.

15. A controller as defined in claim 11 wherein said processing means is microprocessor based and said adjustment means is an inverter.

* * * * *